US007953088B2

(12) United States Patent
Cheriton et al.

(10) Patent No.: US 7,953,088 B2
(45) Date of Patent: May 31, 2011

(54) METHOD AND APPARATUS FOR PACKET CLASSIFICATION AND REWRITING (75) Inventors: David R. Cheriton, Palo Alto, CA (US); Fusun Ertemalp, Menlo Park, CA (US)

(73) Assignee: Cisco Technology, Inc., San Jose, CA (US)

( * ) Notice: Subject to any disclaimer, the term of this patent is extended or adjusted under 35 U.S.C. 154(b) by 1809 days.

(21) Appl. No.: 10/457,906

(22) Filed: Jun. 10, 2003

(65) Prior Publication Data
US 2004/0252693 A1 Dec. 16, 2004

(51) Int. Cl.
H04L 12/54 (2006.01)
H04L 12/56 (2006.01)
(52) U.S. Cl. ........................................ 370/392; 370/428
(58) Field of Classification Search .................. 370/392, 370/349, 428
See application file for complete search history.

(56) References Cited

U.S. PATENT DOCUMENTS

| 5,748,611 | A | 5/1998 | Allen et al. | 370/224 |
|---|---|---|---|---|
| 6,452,915 | B1* | 9/2002 | Jorgensen | 370/338 |
| 7,171,683 | B2* | 1/2007 | Pazi et al. | 726/13 |
| 7,386,628 | B1* | 6/2008 | Hansell et al. | 709/238 |
| 7,782,867 | B2* | 8/2010 | Suzuki et al. | 370/395.31 |
| 2002/0054596 | A1 | 5/2002 | Sengodan | 370/395.21 |
| 2003/0039245 | A1* | 2/2003 | Khosravi et al. | 370/389 |
| 2003/0048793 | A1* | 3/2003 | Pochon et al. | 370/401 |
| 2003/0103459 | A1* | 6/2003 | Connors et al. | 370/235 |
| 2004/0139170 | A1* | 7/2004 | Shen et al. | 709/218 |
| 2004/0151179 | A1* | 8/2004 | Andre et al. | 370/392 |
| 2004/0252693 | A1* | 12/2004 | Cheriton et al. | 370/395.1 |
| 2005/0185651 | A1* | 8/2005 | Rinne | 370/395.1 |
| 2006/0239273 | A1* | 10/2006 | Buckman et al. | 370/395.41 |

FOREIGN PATENT DOCUMENTS

| EP | 1 134 939 A1 | 9/2001 | 12/56 |
|---|---|---|---|
| WO | WO 01/33777 A2 | 5/2001 | 12/56 |

OTHER PUBLICATIONS

Simultaneous multithreading-based routers Vibhatavanij, K.; Nian-Feng Tzeng; Kongmunvattana, A.; Parallel Processing, 2000. Proceedings. 2000 International Conference.*
IPv6 based-On Demand Resource Management in Diffserv (RMD); Goering—Electrical Engineering, 2003.*
Blake, et al., *An Architecture for Differentiated Services*, RFC2475, IETF Standard, Internet Engineering Task Force, IETF, CH, XP015008259, Dec. 1998.

* cited by examiner

*Primary Examiner* — Salman Ahmed
(74) *Attorney, Agent, or Firm* — Campbell Stephenson LLP (57) ABSTRACT

In one embodiment, a method for processing a packet is disclosed. The method includes classifying the packet and determining an action to be taken with regard to the packet. Classifying the packet includes using information in the packet to perform the classification. The determination made as to the action to be taken with regard to the packet is based on the classifying that is performed, and is performed using a plurality of rules. At least one of the rules is configurable. The information in the packet is related to time-to-live (TTL) data corresponding to the packet.

80 Claims, 5 Drawing Sheets

METHOD AND APPARATUS FOR PACKET CLASSIFICATION AND REWRITING

BACKGROUND OF THE INVENTION

1. Field of the Invention

This invention relates to the field of information networks, and more particularly relates to a method and apparatus for classifying and processing network packets.

2. Description of the Related Art

Time-to-live (TTL) is a value (e.g., in an Internet Protocol (IP) packet) that is used by a network device such as a network router to determine whether or not the packet has been in the network too long and, if so, should be discarded. For a number of reasons, packets may not get delivered to their destination in a reasonable length of time. For example, a combination of incorrect routing tables could cause a packet to loop endlessly. A solution is to discard the packet after a certain time and send a message to the originator, who can decide whether or not to resend the packet. Under the Internet Protocol, the initial TTL value is set, usually by a system default, in an 8-binary digit field of the packet header. Originally, TTL was defined as specifying a certain time span in seconds that, when exhausted, would cause the packet to be discarded, and bounded the lifetime of a packet in the Internet.

However, in practice, TTL has not typically been implemented in a manner that accurately reflects the term (with a few exceptions) because of the cost of accounting for the time a packet spends queued. Rather than adjust the TTL on a time value basis, then, each router transited typically uses a simplified process, subtracting one count from the TTL field.

Thus, in effect, the count is usually taken to indicate the number of router hops the packet is allowed before the packet must be discarded (i.e., the TTL is actually implemented as a hop count). In fact, this has been recognized by IPv6 (in which the field has been renamed accordingly). In operation, then, each router that receives a packet subtracts one from the count in the TTL field. When the count reaches zero, the router detecting that condition discards the packet and sends an Internet Control Message Protocol (ICMP) message back to the originating host.

Unfortunately, there is no clear agreement on the correct setting of TTL, and the consequences for setting TTL values too low can be problematic (i.e., failed connectivity). The current TTL default value of 64 (as specified in Network Working Group RFC 1340) is presently more than three years old. Moreover, the default values used in various operating systems cover a substantial range. For example, TTL values in the TCP packets used by various operating systems vary from 30 to 255, as do the TTL values in the UDP packets. At the lower end of this range, packets may never arrive at their intended destination, while at the upper end of this range, packets may float through the Internet much longer than intended or desirable (leading to unnecessary resource consumption (bandwidth, router processing resources and the like)).

SUMMARY

A method and apparatus according to the present invention addresses these problems by classifying and processing network packets based on information associated with the packets. Using such information, a method and apparatus according to the present invention classify a packet based on the information associated with the packet, and then process the packet based on the classifying of the packet that is performed. Such processing can include, for example, dropping the packet, re-routing the packet, rewriting portions of the packet or other processing of the packet. The information associated with the packet, used to classify the packet, can be, for example, information in the packet such as source and/or destination IP addresses, time-to-live (TTL) data corresponding to the packet, or other such information.

In one embodiment, a method for processing a packet is disclosed. The method includes classifying the packet and determining an action to be taken with regard to the packet. Classifying the packet includes using information in the packet to perform the classification. The determination made as to the action to be taken with regard to the packet is based on the classifying that is performed, and is performed using a plurality of rules. At least one of the rules is configurable. The information in the packet is related to time-to-live (TTL) data corresponding to the packet.

In another embodiment, a network device is disclosed. The network device includes a classification unit. The classification unit is configured to determine, using a plurality of rules, an action to be taken with regard to a packet by virtue of being configured to classify the packet using information in the packet. At least one of the rules is configurable, and the information in the packet is related to time-to-live (TTL) data corresponding to the packet.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and numerous objects, features, and advantages made apparent to those skilled in the art by referencing the accompanying drawings.

The use of the same reference symbols in different drawings indicates similar or identical items.

DETAILED DESCRIPTION OF THE INVENTION

The following is intended to provide a detailed description of an example of the invention and should not be taken to be limiting of the invention itself. Rather, any number of variations may fall within the scope of the invention which is defined in the claims following the description.

Introduction

The invention provides a method and apparatus that allow a network device (e.g., a router) to classify packets based on time-to-live (TTL) data corresponding to the packet, information in the packet related to TTL data corresponding to the packet, or other such information in the packet, as well as allowing the network device to rewrite the TTL information for a packet to one of any number of values on egress, based on one or more rules. This approach can be used to allow the TTL information for a packet to be used (e.g., as an indication of the total number of transit links that a packet has crossed), as well as allowing the use of a TTL tag (an N:1 mapping of TTL information for a packet to a given TTL tag value corresponding to one or more rules). As an alternative, other information associated with the packet (e.g., information in the packet such as source and/or destination IP addresses or other IP header information) can be used to control processing of the packet, which is generically referred to herein as information that is related to the TTL data corresponding to the packet. Thus, TTL data such as the TTL information for a packet or a TTL tag can be used to control the processing of the packet.

More specifically, in one embodiment, a datapath chip, upon receipt of an internet protocol (IP) packet, segregates possible TTL values into a corresponding set of specified ranges. Each of the ranges is then assigned a TTL classification. Such ranges of values can be specified, for example, as part of the network device's configuration. For example, the ranges of 0-1, 1-254 and 255-255 might be included in a network device's configuration at start-up. These ranges can then be mapped to TTL classifications of 0, 1 and 2, respectively. Such an example is described in connection with FIGS. 3 and 5.

Once the TTL value is mapped to a TTL classification, the TTL classification (also referred to herein as a TTL tag) is then passed as part of the flow label, and an action determined by a classification mechanism within the network device. This functionality might be effected in hardware, for example, using a Content Addressable Memory (CAM) (e.g., a Ternary Content Addressable Memory (TCAM), or some other type of CAM). The flow label can be used to perform the lookup operation. This lookup operation matches the flow label (including the TTL tag) to an entry that determines the set of actions to be taken with regard to the packet. Such actions include an indication as to how the packet's TTL is to be processed (e.g., by being rewritten). Actions can include setting the TTL to a given value, decrementing the TTL, or leaving the TTL unmodified, as well as conventional actions such as causing the packet to be dropped or forwarded to the network device's processor (central processing unit, or CPU).

The network device can also be configured to maintain statistics on packets, based on TTL, by using conventional counters on each TCAM entry. The egress rewrite to a specified value can be determined directly as an arbitrary TTL value between 0 and 255 or can be an index into a set of TTL rewrite registers, supporting a smaller set of values and thus reducing the space cost of the implementation. This is particularly useful in situations where only a small number of values are of interest, which is often the case.

As an alternative implementation, the complete TTL value can be passed directly to the classification mechanism, at the cost of passing extra information and greater cost in the classification mechanism. However, this localizes the packet processing and classification circuitry, and so, simplifies revision of the associated circuitry and provides for more efficient operation. As noted elsewhere herein, other information (e.g., source and/or destination IP addresses) can be used in the classification of packets, and so in the determination of the packets' processing and the processing of the TTL data corresponding to the packet.

Mechanisms according to the present invention are a significant and novel generalization of the conventional handling of TTL information for a packet, in which a network device (e.g., a router) simply checks only for a TTL of 0 or 1 on ingress, and either decrements the TTL on egress or drops the packet (as a result of the packet's TTL being 0).

Example of An Apparatus for Packet Classification and Rewriting

Figure 1:
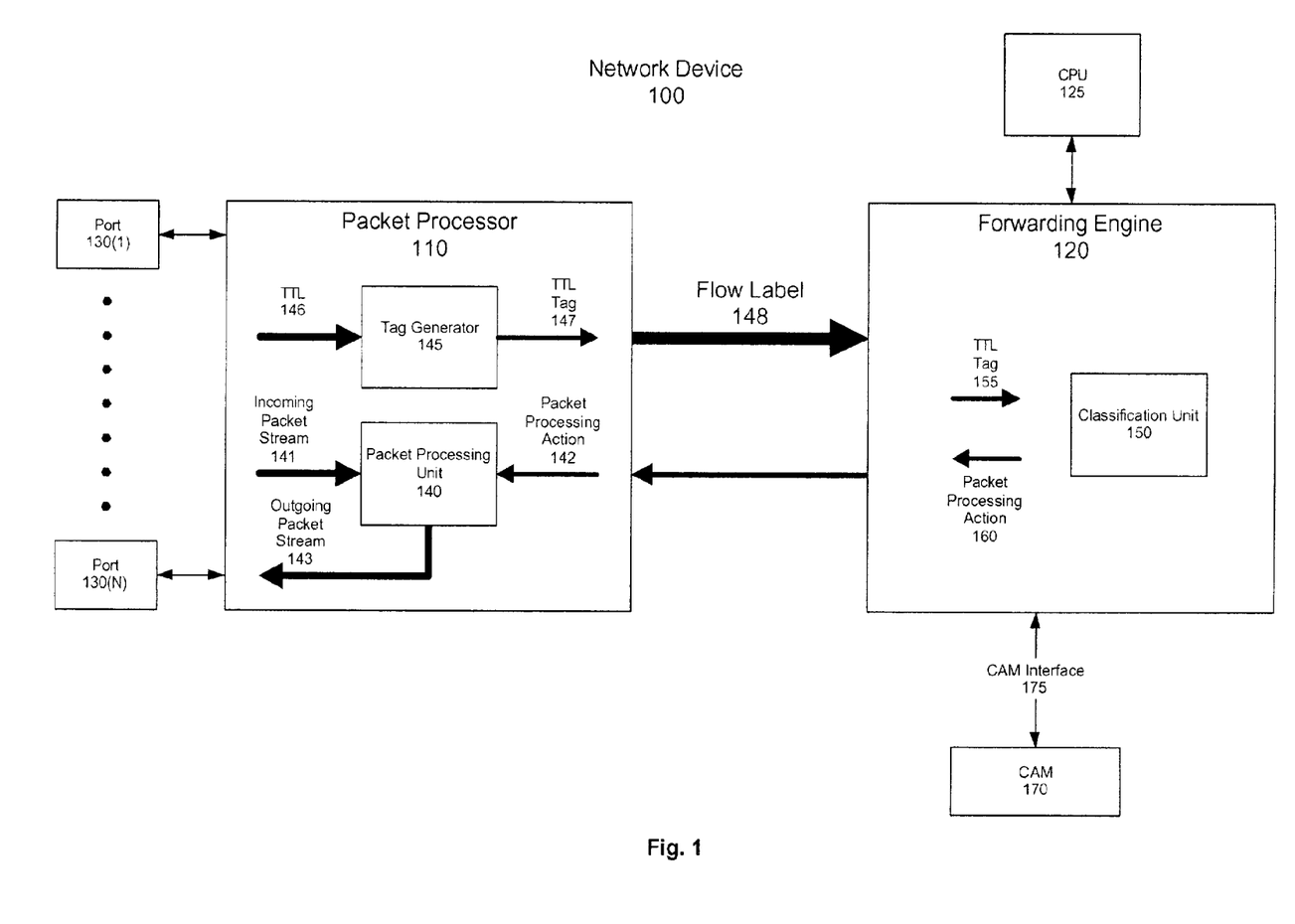
FIG. 1 is a block diagram illustrating a network device that incorporates embodiments of the present invention.

FIG. 1 is a block diagram illustrating an architecture of a network device 100 according to embodiments of the present invention. Network device 100 includes a packet processor 110 and the forwarding engine 120. Packet processor 110 and forwarding engine 120 communicate with one another, for example, over bus structures that allow the transfer of data and control information between the two. Additionally, forwarding engine 120 communicates with, and is under the control of, a control processor (depicted in FIG. I as a central processing unit (CPU) 125). Packet processor 110 is also in communication with a number of ports (depicted as ports 130(1)-(N) in FIG. 1).

Packet processor 10 includes a packet processing unit 140. Packet processing unit 140 receives an incoming packet stream 141 (which is received from one or more of ports 130(1)-(N)), as well as a packet processing action 142 (which is received from forwarding engine 120). Packet processing unit 140 uses packet processing action 142 to determine the action(s) to be taken with regard to incoming packets within incoming packet stream 141. These operations result in an outgoing packet stream 143. Outgoing packet stream 143 represents, generically, the packets after processing, and it should be understood that such processing can include redirection of a given packet to another section of network device 100 for further processing (rather than only the rewriting of the TTL information for the packet). An example of such further processing would be the forwarding of the packet to CPU 125 for further processing (wherein CPU 125 acts as an exception handling unit, by handling packets deemed exception packets under the rules implemented by this implementation of the present invention).

Also included in packet processor 110 is a tag generator 145. Tag generator 145 receives time-to-live (TTL) information for a given packet (depicted in FIG. 1 as a time-to-live (TTL) 146), and generates therefrom a TTL tag 147, which is provided to forwarding engine 120 as part of a flow label 148. Tag generator 145 can be implemented, for example, using a number of comparators (as evidenced by the comparisons made in the flow diagram of FIG. 3). In that scenario, there would be a correspondence between each comparator, the classification of the TTL, and the rule(s) implemented for each such classification.

In turn, forwarding engine 120 receives TTL tag 147 as part of flow label 148, and, based upon processing performed by forwarding engine 120, (and potentially, CPU 125), provides packet processing information 142 to packet processor 110. Internally, forwarding engine 120 includes a classification unit 150. Classification unit 150 receives TTL tag 147 as a TTL tag 155 and generates therefrom a packet processing action 160. As will be apparent to one skilled in the art, packet processing action 160 is received by packet processor 110 as packet processing action 142, and TTL tag 147 is received by forwarding engine 120 as TTL tag 155. In certain embodiments, classification unit 150 employs a content-addressable memory (CAM), such as CAM 170. Classification unit 150 communicates with CAM 170 using a CAM interface 175.

In operation, network device 100 processes packets in the following manner. First, a packet is received at one of ports 130(1)-(N) and appears in packet processor 110 as a portion of incoming packet stream 141, which is passed to packet processing unit 140. The TTL information for the packet (TTL 146) is passed to tag generator 145 which generates TTL tag 147 therefrom. TTL tag 147 is passed to forwarding engine 120 as part of a flow label 148, and is received as TTL tag 155. TTL tag 155 is processed by classification unit 150, which generates packet processing action 160 therefrom.

Packet processing action 160 is passed from forwarding engine 120 to packet processor 110 (appearing at packet processor 110 as packet processing action 142). Packet processing action 142 is received by packet processing unit 140, and, in turn, packet processing unit 140 performs the packet processing indicated by packet processing action 142. This results in the now-processed packet being output from packet processing unit 140 as outgoing packet stream 143. Outgoing packet stream 143 is then directed to one of ports 130(1)-(N) for transmission onto the network.

Alternatively, the functions performed by tag generator 145 and classification unit 150 can be implemented in a single module (e.g., within forwarding engine 120). In this scenario, TTL 146 (in its entirety) is passed from packet processor 110 to forwarding engine 120. Once within forwarding engine 120, TTL 146 is classified and an appropriate packet processing action is generated and sent (as packet processing action 160), and appears at packet processor 110 as packet processing action 142.

The trade-offs between these two approaches involve the resources of network device 100, and the flexibility required of the architecture of network device 100. It will be apparent that the functions of tag generator 145 and classification unit 150 can be combined in a single module (e.g., forwarding engine 120). If this approach is taken, revisions to the integrated circuits (ICs) implementing packet processor 110 and forwarding engine 120 are simplified, because any change to the TTL classification circuitry will be localized, impacting only one IC (or one set of ICs).

In contrast, as depicted in FIG. 1, tag generator 145 can be situated within packet processor 110. In this scenario, the pin count of the ICs implementing packet processor 110 and forwarding engine 120 are reduced, because only the (smaller) TTL tag is passed from packet processor 110 to forwarding engine 120. Typically, TTL information for a packet will be represented by a greater number of bits than that used to represent the TTL tag, because of the N:1 mapping between TTL information and its corresponding TTL tag. For example, TTL information for an IP packet implemented as a hop count will use 8 bits, allowing values of 0-255. In the examples posited herein, these values are mapped to one of three possible TTL classifications (0, 1, 2), which can be represented using 2 bits. Thus, in this example, the number of lines for TTL information is reduced from 8 lines (bits) to 2 lines (bits), when implemented in a parallel bus.

If the TTL information is serialized, using 2 bits rather than 8 bits simplifies the circuitry at both ends of the transmission line. This is because only 2 bits must be clocked in and out, rather than 8 bits. Thus, the circuitry for a 2 bit implementation will be made simpler and more compact, for example, through the use of smaller registers. Thus, the trade-off can be thought of in tens of pin count versus architectural simplicity, with the advantages of splitting tag generator 145 and classification unit 150 between modules dwindling as the number of classifications increases (thereby increasing the number of bits required in the TTL tag).

It should also be noted that the use of a TTL tag also provides an additional benefit, in that the number of lines needed to implement CAM interface 175 can be favorably impacted by the smaller number of lines (bits) required by a TTL tag (rather than the full TTL information). This means that the number of lines (bits) required to be supplied to CAM 170 is reduced, reducing the cost and complexity of the interface between forwarding engine 120 and CAM 170. Moreover, fewer bits means that the amount of memory space required in CAM 170 is reduced, further reducing the resources necessary to support such an implementation of the present invention.

It will be noted that the variable identifier "N" is used in several instances in the figures described herein to more simply designate the final element of a series of related or similar elements. The repeated use of such variable identifiers is not meant to necessarily imply a correlation between the sizes of such series of elements, although such correlation may exist. The use of such variable identifiers does not require that each series of elements has the same number of elements as another series delimited by the same variable identifier. Rather, in each instance of use, the variable identified by "N" (or any other such identifier) may hold the same or a different value than other instances of the same variable identifier.

Moreover, regarding the signals described herein, those skilled in the art will recognize that a signal may be directly transmitted from a first block to a second block, or a signal may be modified (e.g., amplified, attenuated, delayed, latched, buffered, inverted, filtered or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block may be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The foregoing described embodiment wherein the different components are contained within different other components (e.g., the various elements shown as components of network device 100). It is to be understood that such depicted architectures are merely examples, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality.

While implementing a reasonably large amount of this processing in hardware is desirable, it will be apparent to one of skill in the art that the ability to load the rules used in analyzing packets in a manner according to embodiments of the present invention is also desirable, because the use of software-based rules allows for ease of upgrade, dynamic analysis, lower cost resulting from simpler hardware, and other such advantages. Thus, for example, the use of a TTL tag can be included in access control list (ACL) information, allowing an administrator to easily revise the rules (and so actions) related to one or more given TTL values.

An Example Process for Packet Classification and Rewriting

Figure 2:
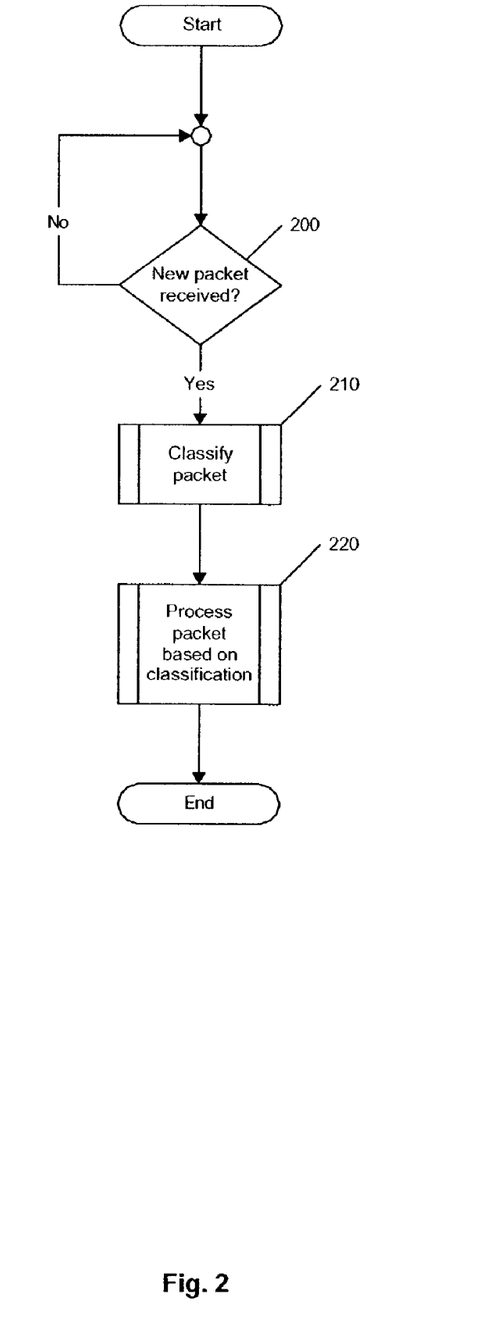
FIG. 2 is a flow diagram illustrating a process of packet classification and processing according to embodiments of the present invention.

FIG. 2 is a flow diagram illustrating, generally, a process for packet classification and rewriting according to embodiments of the present invention. The process begins with the receipt of a packet (or frame or other unit of communication) (step 200). As can be seen in FIG. 2, the process simply loops until a new packet is received. Upon the receipt of a packet, the packet is first classified (step 210). The classification is based on time-to-live information for the received packet. Such information may include a time-to-live of the packet, a hop count of the packet, or some other time-to-live information regarding the age of the packet. An example of the classification of a packet is provided in connection with FIG. 3. Once the packet has been classified, the packet can then be processed based on the packet's classification (step 220). The steps of processing a packet based on its classification is described in further detail in connection with FIGS. 4 and 5.

It will be apparent that a great deal of flexibility is provided by allowing a variety of rules to be implemented, based on the value of the TTL information for a given packet. This is especially true when such rules can be implemented in software (e.g., the previous ACL example). Each situation, vis-à-vis a potential value (or values) of the TTL information, can be codified into a rule implemented by classification unit 150 (whether in hardware or software). By mapping multiple possible value(s) of the TTL information to a TTL tag value (i.e., an N:1 mapping), appropriate action(s) can be taken on the packet associated therewith. This provides a number of benefits, some noted earlier, such as reducing circuit complexity, reducing the size of access control lists (ACLs), reducing the size of various memory elements (including CAM 170), reducing IC area requirements, and the like.

Moreover, it will be appreciated that, in such a process, information other than time-to-live (TTL) data corresponding to a given packet may be used to classify the packet in question. Indeed, any of the routing, network or other such information in a packet can be used in making such a determination, although often, the information thus used will be in the tuple that is passed between packet processor 110 and forwarding engine 120 as flow label 148. More specifically, this information can include, for example, source and/or destination IP addresses and the like, which can be used to make such determrninations, without the need to examine TTL data corresponding to the packet. For example, by matching access control list entries using only a packet's IP destination address, a classification stage can determine that the TTL data corresponding to the packet should be rewritten to a specific value. Thus, the value of the TTL data corresponding to the packet can be ignored in such a classification stage.

As noted, FIG. 2 depicts a flow diagram illustrating a process according to an embodiment of the present invention. It is appreciated that operations discussed herein may consist of directly entered commands by a computer system user or by steps executed by application specific hardware modules, but the preferred embodiment includes steps executed by software modules. The functionality of steps referred to herein may correspond to the functionality of modules or portions of modules. The operations referred to herein may be modules or portions of modules (e.g., software, firmware or hardware modules). For example, although the described embodiment includes software modules and/or includes manually entered user commands, the various example modules may be application specific hardware modules. The software modules discussed herein may include script, batch or other executable files, or combinations and/or portions of such files. The software modules may include a computer program or subroutines thereof encoded on computer-readable media.

Additionally, those skilled in the art will recognize that the boundaries between modules are merely illustrative and alternative embodiments may merge modules or impose an alternative decomposition of functionality of modules. For example, the modules discussed herein may be decomposed into submodules to be executed as multiple computer processes, and, optionally, on multiple computers. Moreover, alternative embodiments may combine multiple instances of a particular module or submodule. Furthermore, those skilled in the art will recognize that the operations described in example embodiment are for illustration only. Operations may be combined or the functionality of the operations may be distributed in additional operations in accordance with the invention.

Alternatively, such actions may be embodied in the structure of circuitry that implements such functionality, such as the micro-code of a complex instruction set computer (CISC), firmware programmed into programmable or erasable/programmable devices, the configuration of a field-programmable gate array (FPGA), the design of a gate array or full-custom application-specific integrated circuit (ASIC), or the like.

Each of the blocks of the flow diagram may be executed by a module (e.g., a software module) or a portion of a module or a computer system user. Thus, the above described method, the operations thereof and modules therefor may be executed on a computer system configured to execute the operations of the method and/or may be executed from computer-readable media. The method may be embodied in a machine-readable and/or completer-readable medium for configuring a computer system to execute the method. Thus, the software modules may be stored within and/or transmitted to a computer system memory to configure the computer system to perform the functions of the module.

Such a computer system normally processes information according to a program (a list of internally stored instructions such as a particular application program and/or an operating system) and produces resultant output information via I/O devices. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Such a computer system typically includes multiple computer processes executing "concurrently." Often, a computer system includes a single processing unit which is capable of supporting many active processes alternately. Although multiple processes may appear to be executing concurrently, at any given point in time only one process is actually executed by the single processing unit. By rapidly changing the process executing, a computer system gives the appearance of concurrent process execution. The ability of a computer system to multiplex the computer system's resources among multiple processes in various stages of execution is called multitasking. Systems with multiple processing units, which by definition can support true concurrent processing, are called multiprocessing systems. Active processes are often referred to as executing concurrently when such processes are executed in a multitasking and/or a multiprocessing environment.

The software modules described herein may be received by such a computer system, for example, from computer readable media. The computer readable media may be permanently, removably or remotely coupled to the computer system. The computer readable media may non-exclusively include, for example, any number of the following: magnetic storage media including disk and tape storage media optical storage media such as compact disk media (e.g., CD-ROM, CD-R, etc.) and digital video disk storage media nonvolatile memory storage memory including semiconductor-based memory units such as FLASH memory, EEPROM, EPROM, ROM or application specific integrated circuits volatile storage media including registers, buffers or caches, main memory, RAM, and the like and data transmission media including computer network, point-to-point telecommunication, and carrier wave transmission media. In a UNIX-based embodiment, the software modules may be embodied in a file which may be a device, a terminal, a local or remote file, a socket, a network connection, a signal, or other expedient of communication or state change. Other new and various types of computer-readable media may be used to store and/or transmit the software modules discussed herein.

Figure 3:
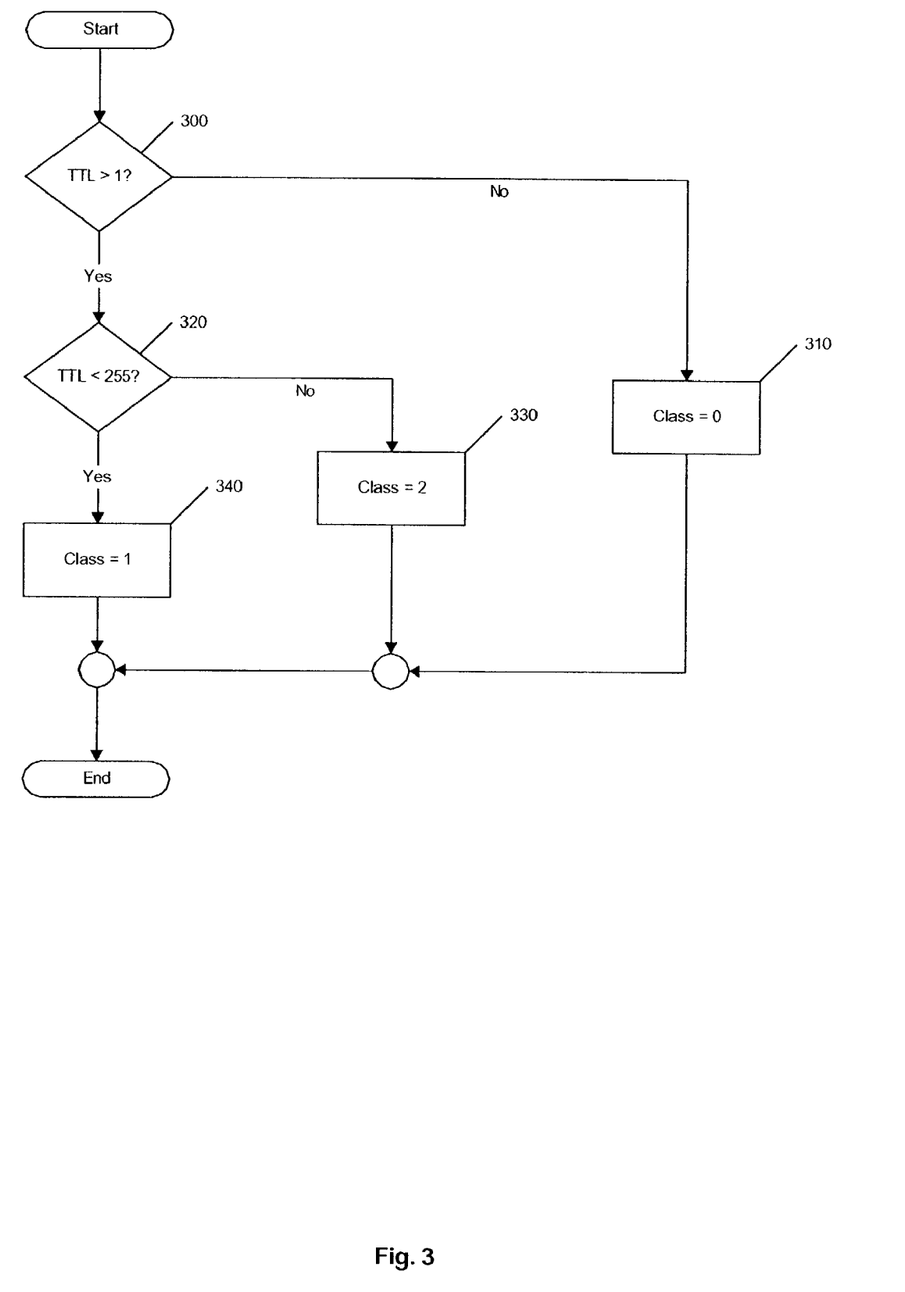
FIG. 3 is a flow diagram illustrating a process of packet classification according to embodiments of the present invention in further detail.

FIG. 3 is a flow diagram illustrating a process according to the present invention classifying a packet based on time-to-live information for the packet received. The process begins with a determination as to whether the time-to-live (TTL) is greater than one (TTL>1) (step 300). If the TTL is not greater than one (TTL<=1), the packet received is classified as a class zero packet (step 310). Alternatively, if the TTL for the packet received is greater than one (TTL>1), a determination is made as to whether the TTL for that packet is less than 255 (TTL<255) (step 320). If the TTL for the packet received is not less than 255 (TTL>=255), the packet is classified as a class 2 packet (step 330). If the TTL for the packet is less than 255 (TTL<255), the packet is classified as a class 1 packet (step 340).

Figure 4:
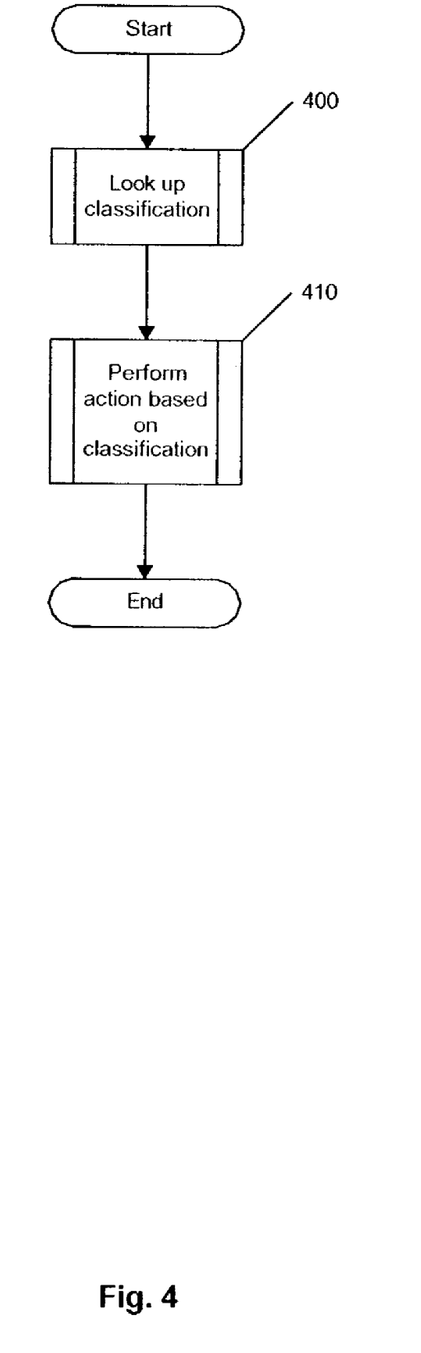
FIG. 4 is a flow diagram illustrating a process of packet processing according to embodiments of the present invention.

FIG. 4 is a flow diagram of the actions performed in processing a packet based on that packet's classification. In one embodiment of the present invention, this process begins by looking up the packet's classification (step 400). Once the packet's classification has been determined, one or more actions are performed based on the packet's classification (step 410). An example of classification look-up and the performance of actions based on that classification are provided in connection with FIG. 5.

Figure 5:
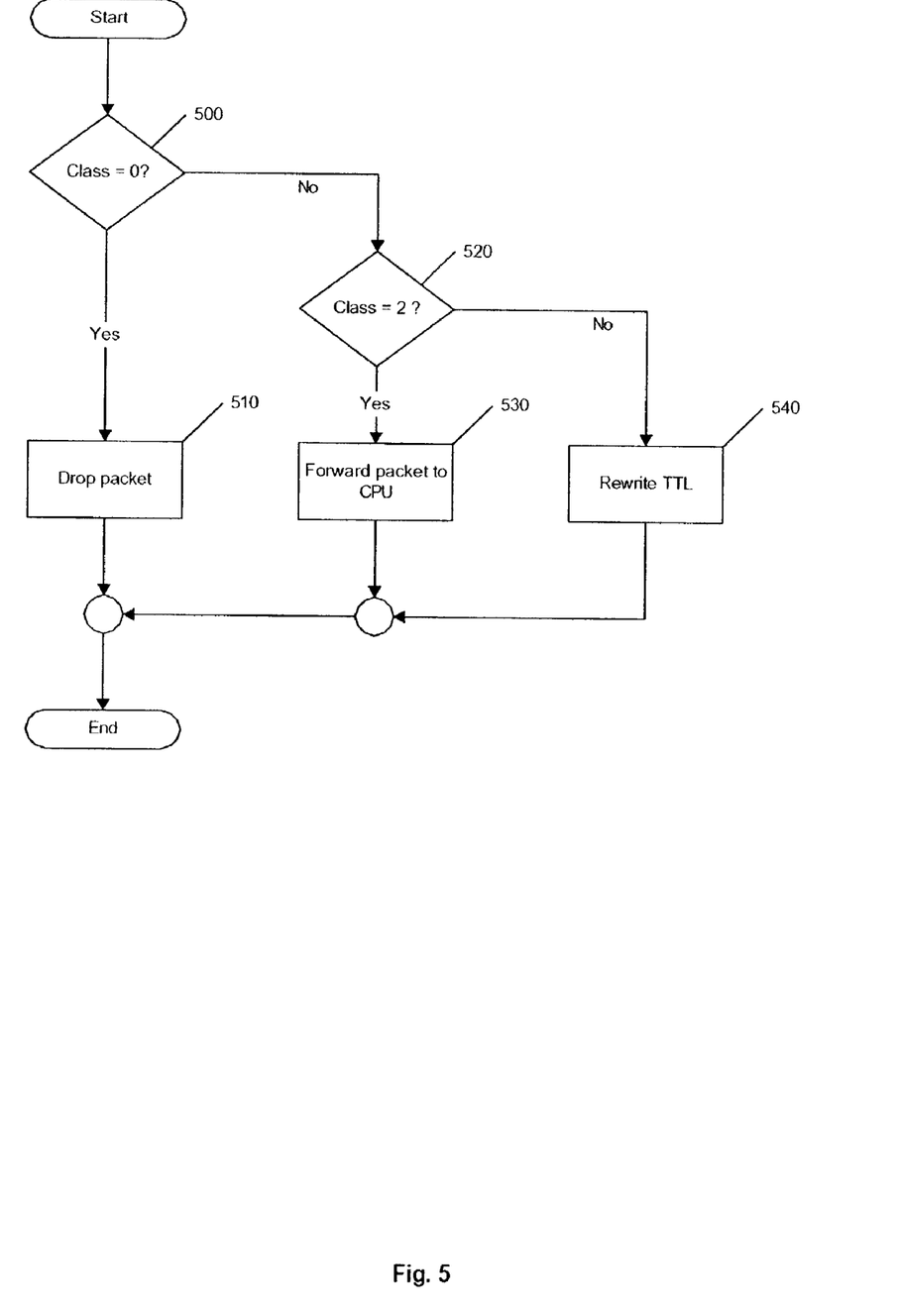
FIG. 5 is a flow diagram illustrating a process of packet processing according to embodiments of the present invention in further detail.

FIG. 5 is a flow diagram illustrating an example of the actions performed in looking up a packet's classification and performing one or more actions based on the packet's classification, in an embodiment of the present invention. The process begins with the determination as to whether the packet's classification is of a class 0 (step 500). If such is the case, the packet is simply dropped (step 510). If the packet's classification is not 0, a determination is then made as to whether the packet's classification is of a class 2 (step 520). If the packet's classification is of a class 2, the packet is forwarded to the network device's CPU for processing (step 530). However, if the packet's classification is not of a class 2, the TTL for the packet is rewritten (step 540).

While the preceding configurations have been discussed in terms of a single classification operation, it should be noted that the range of actions which can be taken with regard to a given packet can, in fact, be determined via multiple stages of classification. For example, such determinations can be divided into those resulting in the rewriting of TTL information, and dropping/further processing of packets. In such a scenario, rewriting TTL information to a specific value can be determined by a routing lookup stage within network device 100, while the dropping of packets with certain TTL values or redirecting such packets to CPU 125 for further processing can be implemented by the input packet classification stage (e.g., via entries in an access control list of network device 100).

It should be noted that the preceding figures and description are merely examples of the kinds of processing made possible by a method and apparatus according to the present invention. Thus, the flow diagrams presented in FIGS. 2 and 4 are meant to depict the fact that the present invention can implement a very flexible, complex set of rules. Further, the scenarios presented in FIGS. 3 and 5 depict the implementation of a simple set of rules, and are intended only to serve as a vehicle for discussion. Typically, much more complex rule sets will be implemented. A significant number of rules of varying complexity can therefore be implemented to allow complex processing of packets based on the TTL information for those packets. Examples of potential implementations made possible by the present invention are now described.

One such implementation allows a network to discern whether a packet is sourced from outside or within an enterprise's network. For example, an enterprise/campus edge router can be used to force all client host packets to a TTL of 255. This allows for the reliable determination, at each receiving host in the enterprise, the number of hops that a packet has traveled. If the TTL for the packet indicates that the packet originated too far away, the packet can be dropped. More specifically, a server that should only accept packets from hosts within the enterprise can reject packets with a TTL less than 255-R, where R is the known radius of the enterprise. This filtering can also be performed by a router in front of this server, obviating the need to modify the server in order to provide such functionality. It should also be noted that the ability to revise such rules in software can prove useful as the enterprise network's topology changes (e.g., the enterprise network grows).

The same approach can be used to restrict access within a region of the enterprise's network. For example, the access provided to a certain group of servers (e.g., the institution's finance servers) may be restricted to only those nodes (machines) that are close by (i.e., within the finance subnet). Although conventional address filtering techniques can be used to achieve this objective, the extra protection provided through the present invention's use of TTL information is desirable, given the high incident of insider attacks. This is especially true given the difficulty associated with TTL spoofing.

Similarly, a firewall router can reduce the TTL of all remote packets to R, for example, so that these packets are clearly distinguished from local packets. Filters on routers in front of critical servers are then able to protect those servers against external packets that might leak through the firewall(s) protecting those servers.

Further, this invention can be used with control traffic to routers to protect against denial-of-service (DOS) attacks again a router's CPU. This includes all routing protocols and remote console access. Moreover, this can be accomplished without modifying the routing code resident on the router.

The present invention also allows a network administrator to monitor and correct for the TTL being used by end hosts without having to modify the host systems. For example, if an enterprise is running a legacy system with a low TTL (e.g., a TTL of 30) and encounters difficulties in communicating with a certain destination (e.g., stops working because of an increase in network diameter), the adjacent router can be used to increase the TTL of the packets that router sends without having to modify the legacy system.

Additionally, the present invention provides a flexible implementation for existing and proposed handling of TTL information, obviating the difficulties present in hard-wired handling of TTL information that is used in current hardware routers. The present invention generally provides a value-added role for routers implementing the present invention, in managing security and network access.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Moreover, while the invention has been particularly shown and described with reference to these specific embodiments, it will be understood by those skilled in the art that the foregoing and other changes in the form and details may be made therein without departing from the spirit or scope of the invention.

What is claimed is:

1. A network device comprising:
a classification unit, wherein said classification unit is configured to
assign a packet to a class by virtue of being configured to classify said packet based on a time-to-live (TTL) value in a TTL field in a packet header of said packet, wherein
said class corresponds to a range,
said range is one of a plurality of ranges, and
each of said plurality of ranges comprises a range of TTL values,
assign a TTL classification value to said packet in response to classifying said packet, by virtue of being configured to modify a flow label field of the packet header to include the TTL classification value, wherein
a number of bits used to represent the TTL classification value is less than a number of bits used to represent the TTL value, and
determine an action to be taken with regard to said packet, wherein said determination is based on said TTL classification value, said determination is performed using a plurality of rules, and at least one of said rules is configurable.

2. The network device of claim 1, wherein
time-to-live information for said packet corresponds to said time-to-live value of said packet,
each of said ranges of time-to-live values corresponds to a one of a plurality of actions, and
said actions comprise at least one of:
dropping said packet,
decrementing said time-to-live value of said packet,
decrementing said time-to-live value of said packet to generate a decremented time-to-live value of said packet and dropping said packet, if said decremented time-to-live value of said packet is less than a first value, and
setting said time-to-live value of said packet to a second value.

3. The network device of claim 2, further comprising:
an exception handling unit, wherein
said actions further comprise
redirecting said packet to said exception handling unit.

4. The network device of claim 1, wherein
said classification unit is further configured to classify said packet by virtue of being configured to generate a classification,
said classification corresponds to a one of said plurality of ranges of time-to-live values.

5. The network device of claim 4, wherein
time-to-live information for said packet corresponds to said time-to-live value of said packet,
each of said ranges of time-to-live values corresponds to a one of a plurality of actions, and
said actions comprise at least one of:
dropping said packet,
decrementing said time-to-live value of said packet,
decrementing said time-to-live value of said packet to generate a decremented time-to-live value of said packet and dropping said packet, if said decremented time-to-live value of said packet is less than a first value, and
setting said time-to-live value of said packet to a second value.

6. The network device of claim 5, further comprising:
an exception handling unit, wherein
said actions further comprise
redirecting said packet to said exception handling unit.

7. The network device of claim 1, wherein
time-to-live information for said packet corresponds to said time-to-live value of said packet, and
said action is to rewrite said time-to-live value of said packet.

8. The network device of claim 7, wherein a rule corresponding to said action indicates that said rewriting is to be performed when said time-to-live value of said packet is below a minimum time-to-live value.

9. The network device of claim 7, wherein a rule corresponding to said action indicates that said rewriting is to be performed when said time-to-live value of said packet is above a maximum time-to-live value.

10. The network device of claim 1, wherein
time-to-live information is said time-to-live value of said packet.

11. The network device of claim 1, wherein
time-to-live information is a hop count of said packet.

12. The network device of claim 1, wherein
each of said rules relates to one of a plurality of possible actions, and
said possible actions comprise said action.

13. The network device of claim 12, wherein said classification unit comprises:
a content addressable memory, wherein
said rules are implemented using an access control list stored in said content addressable memory.

14. The network device of claim 12, further comprising:
a tag generator, wherein
said tag generator is coupled to said classification unit, and
said tag generator is configured to generate said TTL classification value based on time-to-live information for said packet.

15. The network device of claim 14, wherein
said time-to-live information for said packet corresponds to said time-to-live value of said packet.

16. The network device of claim 15, wherein
said time-to-live information of said packet is a hop count.

17. The network device of claim 15, wherein
said action is to rewrite said time-to-live value of said packet.

18. The network device of claim 14, further comprising:
a forwarding engine, wherein
said forwarding engine comprises said classification unit.

19. The network device of claim 18, wherein said classification unit comprises:
a content addressable memory, wherein
said rules are implemented using an access control list stored in said content addressable memory.

20. The network device of claim 18, further comprising:
a packet processor, wherein
said packet processor comprises said tag generator.

21. The network device of claim 20, wherein said tag generator comprises:
a plurality of comparators, wherein
said comparators are configured to produce a value of said TTL classification value for a range of values of said time-to-live information for said packet.

22. The network device of claim 20, wherein said classification unit comprises:
a content addressable memory, wherein
said rules are implemented using an access control list stored in said content addressable memory.

23. The network device of claim 20, wherein
said forwarding engine is configured to provide said action to said packet processor, and
said packet processor is configured to process said packet based on said action.

24. The network device of claim 12, wherein
time-to-live information for said packet corresponds to said time-to-live value of said packet, and
said action is to rewrite said time-to-live of said packet.

25. The network device of claim 23, wherein
a first number of bits is used to represent a first TTL classification value for said packet,
a second number of bits is used to represent a second TTL classification value of said packet.

26. The network device of claim 1, wherein
each of said rules relates a one of said time-to-live values to a one of a plurality of actions.

27. The network device of claim 26, wherein
a rule of said rules comprises selecting, from said actions, an action to be performed, if said TTL value is less than a minimum limit, and
said action comprises dropping said packet, wherein
said minimum limit indicates said packet originated outside a radius represented by said minimum limit.

28. The network device of claim 26, wherein
a rule of said rules comprises selecting, from said actions, an action to be performed, if said packet is from outside a local network, and
said action comprises setting a time-to-live value of said packet to a pre-determined value.

29. The network device of claim 26, wherein
time-to-live information for said packet corresponds to said time-to-live value of said packet.

30. The network device of claim 29, wherein
a rule of said rules comprises selecting, from said actions, an action to be performed, if said TTL value is within a range of values, and
said action comprises decrementing said time-to-live value of said packet, wherein
said range of values indicates said packet originated within a radius represented by said range of values.

31. The network device of claim 29, wherein
a rule of said rules comprises selecting, from said actions, an action to be performed, if said TTL value is within a range of values, and
said action comprises setting said time-to-live value of said packet to a pre-determined value.

32. A method comprising:
classifying a packet based on a time-to-live (TTL) value in a TTL field in a packet header of said packet, wherein
said classifying assigns said packet to a class,
said class corresponds to a range,
said range is one of a plurality of ranges, and
each of said plurality of ranges comprises a range of TTL values;
assigning a TTL classification value to the packet in response to said classifying, wherein
said assigning comprises modifying a flow label field of the packet header to include the TTL classification value, and
a number of bits used to represent the TTL classification value is less than a number of bits used to represent the TTL value; and
determining, under the control of a processor, an action to be taken with regard to said packet, wherein
said determining is based on said TTL classification value,
said determining is performed using a plurality of rules, and
at least one of said rules is configurable.

33. The method of claim 32, wherein
time-to-live information for said packet corresponds to said time-to-live value of said packet,
each of said ranges of time-to-live values corresponds to a one of a plurality of actions, and
said actions comprise at least one of:
dropping said packet,
decrementing said time-to-live value of said packet,
decrementing said time-to-live value of said packet to generate a decremented time-to-live value of said packet and dropping said packet, if said decremented time-to-live value of said packet is less than a first value, and
setting said time-to-live value of said packet to a second value.

34. The method of claim 33, wherein said actions further comprise:
redirecting said packet to an exception handling unit.

35. The method of claim 33, wherein
said time-to-live information for said packet is a time-to-live of said packet.

36. The method of claim 35, wherein said action comprises:
rewriting said time-to-live value of said packet.

37. The method of claim 36, wherein
said rewriting is performed when said time-to-live value of said packet is below a minimum time-to-live value.

38. The method of claim 36, wherein
said rewriting is performed when said time-to-live value of said packet is above a maximum time-to-live value.

39. The method of claim 33, wherein
said time-to-live information for said packet is a hop count of said packet.

40. The method of claim 33, wherein
said time-to-live information for said packet is equal to one of a plurality of time-to-live values, each of said rules relates a one of said time-to-live values to a one of a plurality of possible actions, and
said possible actions comprise said action.

41. The method of claim 40, further comprising:
rewriting said time-to-live value of said packet.

42. The method of claim 40, wherein
said rules are implemented using an access control list.

43. The method of claim 40, further comprising:
converting a time-to-live of said packet to said time-to-live information for said packet.

44. The method of claim 43, wherein
said time-to-live information of said packet is a hop count.

45. The method of claim 43, wherein
said action is to rewrite said time-to-live value of said packet.

46. The method of claim 43, wherein
a first number of bits is used to represent a first TTL classification value,
a second number of bits is used to represent a second TTL classification value.

47. The method of claim 40, further comprising:
processing said packet by performing said action.

48. The method of claim 47, wherein said processing comprises:
altering said time-to-live value of said packet according to a one of said rules.

49. The method of claim 47, wherein said processing comprises:
rewriting said time-to-live value of said packet.

50. The method of claim 40, wherein said action comprises:
altering said time-to-live value of said packet according to a one of said rules.

51. The method of claim 40, wherein
said time-to-live information for said packet corresponds to said time-to-live value of said packet.

52. The method of claim 51, wherein
said rule comprises selecting said action to be performed, if said time-to-live value of said packet is within a range of values, and
said action comprises setting said time-to-live value of said packet to a pre-determined value.

53. The method of claim 51, wherein
said rule comprises selecting said action to be performed, if said packet is from outside a local network, and
said action comprises setting said time-to-live value of said packet to a pre-determined value.

54. The method of claim 53, wherein
said rule comprises selecting said action to be performed, if said time-to-live value of said packet is less than a minimum limit, and
said action comprises dropping said packet, wherein
said minimum limit indicates said packet originated outside said local network.

55. The method of claim 53, wherein
said rule comprises selecting said action to be performed, if said time-to-live value of said packet is within a range of values, and
said action comprises decrementing said time-to-live value of said packet, wherein
said range of values indicates said packet originated within a radius represented by said range of values.

56. The method of claim 51, wherein
said rule comprises selecting said action to be performed, if said time-to-live value of said packet is less than a minimum limit, and
said action comprises dropping said packet, wherein
said minimum limit indicates said packet originated outside a radius represented by said minimum limit.

57. The method of claim 51, wherein
said rule comprises selecting said action to be performed, if said time-to-live value of said packet is within a range of values, and
said action comprises decrementing said time-to-live value of said packet, wherein
said range of values indicates said packet originated within a radius represented by said range of values.

58. A computer system comprising:
a processor;
a computer readable storage medium coupled to said processor; and
computer code, encoded in said non-transitory computer readable storage medium, configured to
classify said packet based on a time-to-live (TTL) value in a TTL field in a packet header of said packet, wherein
said classifying assigns said packet to a class,
said class corresponds to a range,
said range is one of a plurality of ranges, and
each of said plurality of ranges comprises a range of TTL values,
assign a TTL classification value to said packet in response to classifying said packet, by virtue of being configured to modify a flow label field of the packet header to include the TTL classification value, wherein
a number of bits used to represent the TTL classification value is less than a number of bits used to represent the TTL value, and
determine an action to be taken with regard to said packet, wherein
said computer code is further configured to cause said processor to determine said action, wherein
said determination is based on said TTL classification value,
said determination uses a plurality of rules, and
at least one of said rules is configurable.

59. The computer system of claim 58, wherein
time-to-live information for said packet corresponds to said time-to-live of value of said packet.

60. The computer system of claim 59, wherein said computer code is further configured to cause said processor to:
perform said action by rewriting said time-to-live value of said packet.

61. The computer system of claim 58, wherein
time-to-live information for said packet is equal to one of a plurality of time-to-live values,
each of said rules relates a one of said time-to-live values to a one of a plurality of possible actions, and
said possible actions comprise said action.

62. The computer system of claim 61, wherein said computer code is further configured to cause said processor to:
rewrite said time-to-live value of said packet.

63. The computer system of claim 61, wherein
said rules are implemented using an access control list.

64. The computer system of claim 61, wherein said computer code is further configured to cause said processor to:
process said packet by performing said action, wherein
said processing of said packet comprises altering said time-to-live value of said packet according to a one of said rules.

65. The computer system of claim 61, wherein said time-to-live information for said packet is a time-to-live of said packet, and said computer code is further configured to cause said processor to:
alter said time-to-live value of said packet according to a one of said rules.

66. A non-transitory computer-readable storage medium storing a computer program product, comprising:
a computer-readable storage medium;
a first set of instructions, stored in the computer readable storage medium, executable on a computer system, configured to classify a packet based on a time-to-live (TTL) value in a TTL field in a packet header of said packet, wherein
said first set of instructions further comprises a first subset of instructions configured to assign said packet to a class,
said class corresponds to a range,
said range is one of a plurality of ranges, and
each of said plurality of ranges comprises a range of TTL values;
a second set of instructions, stored in the computer readable storage medium, executable on said computer system, configured to assign a TTL classification value to said packet in response to classifying said packet, wherein
said second set of instructions comprises
a first subset of instructions configured to modify a flow label field of the packet header to include the TTL classification value, wherein
a number of bits used to represent the TTL classification value is less than a number of bits used to represent the TTL value; and
a third set of instructions, stored in the computer readable storage medium, executable on said computer system, configured to determine an action to be taken with regard to said packet, wherein
said determination is based on said TTL classification value,
said determination uses a plurality of rules, and
at least one of said rules is configurable.

67. The computer-readable storage medium storing a computer program product of claim 66, further comprising:
a fourth set of instructions, executable on said computer system, configured to perform said action by rewriting said time-to-live value of said packet.

68. The computer-readable storage medium storing a computer program product of claim 66, wherein
time-to-live information for said packet is equal to one of a plurality of time-to-live values,
each of said rules relates a one of said time-to-live values to a one of a plurality of possible actions, and
said possible actions comprise said action.

69. The computer-readable storage medium storing a computer program product of claim 68, wherein said time-to-live information for said packet corresponds to said time-to-live value of said packet, and further comprising:
a fourth set of instructions, executable on said computer system, configured to rewrite said time-to-live value of said packet.

70. The computer-readable storage medium storing a computer program product of claim 68, wherein
said rules are implemented using an access control list.

71. The computer-readable storage medium storing a computer program product of claim 68, further comprising:

a fourth set of instructions, executable on said computer system, configured to process said packet by virtue of being configured to perform said action, wherein said processing of said packet comprises altering said time-to-live value of said packet according to a one of said rules.

72. The computer-readable storage medium storing a computer program product of claim 68, wherein said time-to-live information for said packet corresponds to said time-to-live of said packet, and further comprising:
a fourth set of instructions, executable on said computer system, configured to alter said time-to-live value of said packet according to a one of said rules.

73. An apparatus comprising:
means for classifying a packet based on a time-to-live (TTL) value in a TTL field in a packet header of said packet, wherein
said classifying assigns said packet to a class,
said class corresponds to a range,
said range is one of a plurality of ranges, and
each of said plurality of ranges comprises a range of TTL values;
means for assigning a TTL classification value to said packet in response to classifying said packet, wherein
said means for assigning comprises means for modifying a flow label field of the packet header to include the TTL classification value, and
a number of bits used to represent the TTL classification value is less than a number of bits used to represent the TTL value; and
means for determining an action to be taken with regard to said packet, wherein
said means for determining is configured to base said determining on said TTL classification value,
said means for determining is configured to use a plurality of rules, and
at least one of said rules is configurable.

74. The apparatus of claim 73, wherein
time-to-live information for said packet corresponds to said time-to-live value of said packet.

75. The apparatus of claim 74, further comprising:
means for rewriting said time-to-live value of said packet, wherein said means for rewriting performs said action.

76. The apparatus of claim 73, wherein
time-to-live information for said packet is equal to one of a plurality of time-to-live values,
each of said rules relates a one of said time-to-live values to a one of a plurality of possible actions, and
said possible actions comprise said action.

77. The apparatus of claim 76, wherein said time-to-live information for said packet corresponds to said time-to-live value of said packet, and further comprising:
means for rewriting said time-to-live value of said packet.

78. The apparatus of claim 76, wherein
said rules are implemented using an access control list.

79. The apparatus of claim 76, further comprising:
means for processing said packet by performing said action, wherein said means for processing comprises means for altering said time-to-live value of said packet according to a one of said rules.

80. The apparatus of claim 76, wherein said time-to-live information for said packet corresponds to said time-to-live value of said packet, and said action comprises:
means for altering a time-to-live value of said packet according to a one of said rules.

* * * * *